H. W. SHONNARD.
MOTIVE FLUID GENERATOR.
APPLICATION FILED AUG. 31, 1914. RENEWED APR. 5, 1916.

1,186,691.

Patented June 13, 1916.
2 SHEETS—SHEET 1.

H. W. SHONNARD.
MOTIVE FLUID GENERATOR.
APPLICATION FILED AUG. 31, 1914. RENEWED APR. 5, 1916.

1,186,691.

Patented June 13, 1916.
2 SHEETS—SHEET 2.

WITNESSES:
Paul N. Critchlow
Thomas J. Thomason

INVENTOR
Harold W. Shonnard
by Christy and Christy
Atty's

UNITED STATES PATENT OFFICE.

HAROLD W. SHONNARD, OF FAR ROCKAWAY, NEW YORK, ASSIGNOR TO CRUCIBLE STEEL COMPANY OF AMERICA, OF PITTSBURGH, PENNSYLVANIA, A CORPORATION OF NEW JERSEY.

MOTIVE-FLUID GENERATOR.

1,186,691. Specification of Letters Patent. Patented June 13, 1916.

Application filed August 31, 1914. Serial No. 859,420. Renewed April 5, 1916. Serial No. 89,187.

*To all whom it may concern:*

Be it known that I, HAROLD W. SHONNARD, residing at Far Rockaway, in the county of Queens and State of New York, a citizen of the United States, have invented or discovered certain new and useful Improvements in Motive-Fluid Generators, of which improvements the following is a specification.

It is the object of the present invention to provide an efficient, reliable and thoroughly practical motive fluid generator, wherein fuel, such as gasolene or alcohol, is burned and steam generated by the heat of combustion, the mixture of steam and products of combustion forming the motive fluid. The generator may be used for any desired purpose, but is particularly well adapted for automobile torpedoes or similar efficiency-exacting conditions of service.

In the accompanying sheets of drawings, forming part of the specification, the preferred embodiment of the invention is illustrated.

Figure 1:
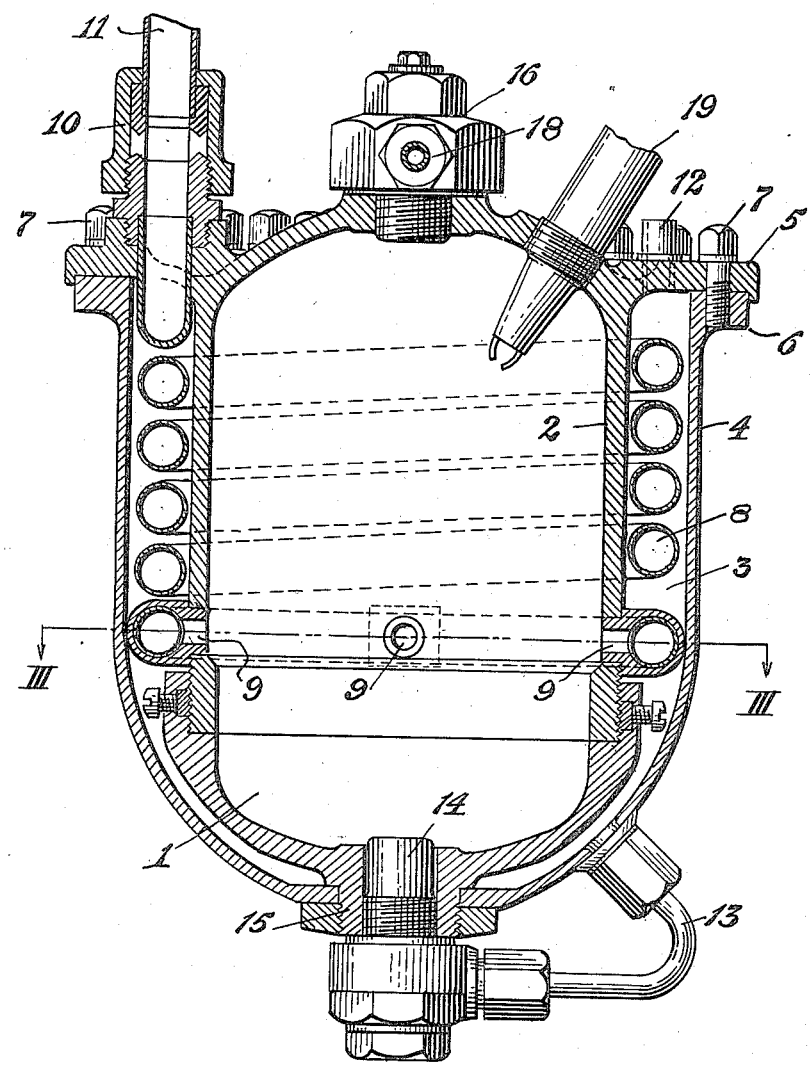
Figure 2:
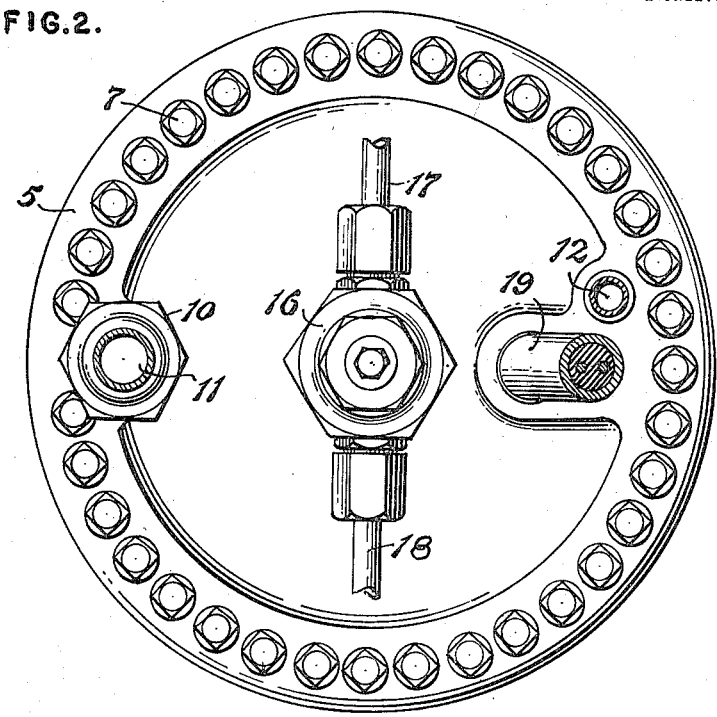
Figure 3:
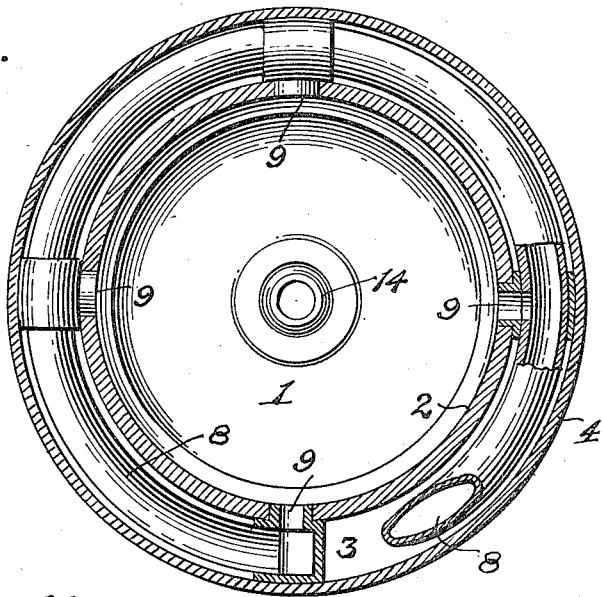

Figure 1 is a longitudinal sectional view of the generator; Fig. 2 a top plan view thereof; and Fig. 3 a transverse sectional view taken on the line III—III, Fig. 1.

In the several figures like numerals are used to designate like parts.

In the practice of my invention, in its preferred form, I provide a generally cylindrical casing, and inject, under pressure and in finely atomized states, fuel and an oxygen carrier at one, and water at the other, end thereof. The casing is of double wall construction forming an annular water-containing compartment from which the water sprayed into the combustion chamber is taken. Within this compartment, and immersed in water, there is placed a pipe coil which communicates with the combustion chamber to afford an escape for the motive fluid mixture generated therein, the water thus being heated to a temperature at which it may be more readily vaporized, and the motive fluid being correspondingly cooled to a workable degree. Structurally, the generator is so made that it may be easily assembled or taken apart.

Referring more particularly to the embodiment of the invention illustrated in the drawings, the combustion and steam-generating chamber 1 lies within an inner casing member 2. The water-containing chamber 3 is formed between the outer wall of the casing 2 and the inner wall of a cup-shaped outer casing 4, the inner casing being provided with a flange 5 and the outer casing with a boss 6, whereby the two may be connected by means of a plurality of stud bolts 7. The motive fluid escape coil 8 is attached to the inner casing 2 and communicates therewith at its lower end by ports 9. The upper end of the coil extends through the flange 5 and terminates with a suitable union coupling 10 for connection to a pipe 11 leading to a motor for which the motive fluid is generated, as for example an internal combustion turbine of an automobile torpedo. Water under pressure from any suitable source enters the chamber 3 through a suitable opening 12 and flows from such chamber through a pipe 13 to the spray nozzle or atomizer 14 located at the lower end of the combustion chamber. As will be seen, this atomizer is screw-threaded exteriorly for attachment to a boss 15 of the casing 2, which boss is in turn screw-threaded exteriorly for attachment to the outer casing 4. Fuel and an oxygen carrier, preferably substantially free oxygen, is sprayed into the upper end of the chamber 1, and in a direction opposite to that of the injected water, by means of a suitable nozzle 16, having fuel and oxygen carrier pipes 17 and 18, respectively, connected thereto. The ignition of the fuel within the combustion chamber may be effected in any desired manner, as, for example, by means of an automatic pressure-operated igniter 19 extending through the casing 2.

When it is desired to disassemble the generator it is necessary only to unscrew the water nozzle 14, remove the bolts 7, and unscrew the inner casing boss 15 from the outer casing 4.

In operation, the water, being sprayed directly opposite to the fuel flame, becomes completely vaporized. By properly regulating the proportions of water, fuel and oxygen carrier sprayed in this manner into the combustion chamber, both with relation to each other and to the extent of heat interchanging surfaces, a highly efficient motive fluid of any desired working temperature may be obtained.

I claim as my invention:

1. A motive fluid generator comprising an inner casing forming a combustion chamber therein, an outer casing forming with said inner casing an annular water-containing chamber, an extended escape conduit communicating with the combustion chamber and lying within the water chamber, means for spraying into one end of the combustion chamber water taken from the annular chamber, and means for spraying fuel and an oxygen carrier into the other end of the combustion chamber.

2. A motive fluid generator comprising an inner casing forming a combustion chamber therein, an outer casing detachably connected to the inner casing and forming therewith an annular water-containing chamber, an escape pipe coiled within the annular chamber and communicating at one end with the combustion chamber, a nozzle at one end of the combustion chamber for injecting therein water taken from the annular chamber, and means for spraying fuel and an oxygen carrier into the other end of the combustion chamber and in a direction opposite to that of the injected water.

3. A motive fluid generator comprising an inner casing forming a closed combustion chamber and providing with a peripheral connecting flange, an outer casing forming with the inner casing an annular water-containing chamber and provided with a boss registering with said inner casing flange, an escape pipe coiled within the annular chamber and secured to and communicating with the combustion chamber, and means for injecting water into one end and fuel and an oxygen carrier into the other end of the combustion chamber.

In testimony whereof I have hereunto set my hand.

HAROLD W. SHONNARD.

Witnesses:
JAMES F. DUFFY,
EMMA B. WEISMAN.